(12) United States Patent
Pieterse

(10) Patent No.: US 7,662,453 B2
(45) Date of Patent: Feb. 16, 2010

(54) MICROWAVABLE AND OVENABLE PACK

(76) Inventor: Susan Nicola Pieterse, 68 Park Street, St. Albans (GB)

( * ) Notice: Subject to any disclaimer, the term of this patent is extended or adjusted under 35 U.S.C. 154(b) by 0 days.

(21) Appl. No.: 10/596,445

(22) PCT Filed: Dec. 17, 2004

(86) PCT No.: PCT/GB2004/005231

§ 371 (c)(1),
(2), (4) Date: Jun. 14, 2006

(87) PCT Pub. No.: WO2005/058727

PCT Pub. Date: Jun. 30, 2005

(65) Prior Publication Data

US 2007/0063011 A1    Mar. 22, 2007

(51) Int. Cl.
*B29D 22/00* (2006.01)
*B29D 23/00* (2006.01)
*B32B 1/08* (2006.01)
*B32B 27/10* (2006.01)

(52) U.S. Cl. .............. 428/34.3; 428/35.7; 428/35.2; 428/35.4; 428/131; 428/134; 426/118; 426/113; 426/114; 426/127; 229/120

(58) Field of Classification Search ............. 428/34.1, 428/34.2, 34.3, 35.2, 35.4, 131, 134, 212, 428/220, 35.7; 426/118, 113, 114, 127; 229/120
See application file for complete search history.

(56) References Cited

U.S. PATENT DOCUMENTS

| 4,757,940 A | * | 7/1988 | Quick et al. ............... 229/5.84 |
| 4,878,765 A | * | 11/1989 | Watkins et al. .............. 383/116 |
| 7,077,923 B2 | * | 7/2006 | Lin ............................ 156/87 |

* cited by examiner

*Primary Examiner*—Michael C Miggins
(74) *Attorney, Agent, or Firm*—Sean Liam Kelleher; Kelleher IP, PLLC

(57) ABSTRACT

A pack suitable for housing liquid and/or solid-liquid contents whose wall comprises a layer of board (3), an inner layer (2) sufficiently impermeable to create a seal between the board (3) and the pack's contents, and an outer protective layer (4,5) covering the board (3), wherein the pack's layers are microwavable and the outer layer (4, 5) is breathable.

14 Claims, 3 Drawing Sheets

MICROWAVABLE AND OVENABLE PACK

BACKGROUND OF THE INVENTION

1. Field of the Invention

The present invention relates to packs suitable for housing liquid and/or solid-liquid contents. The invention relates particularly to packs which are destined to operate in ovens utilising a combination of microwave, conventional heat and forced air technology for rapidly cooking the food products for the convenience of the customer. The invention has particular applications in packs which contain one or more absorber pads such as that of PCT/GB03/03641.

2. Description of the Related Art

In the field of packs which operate in combination ovens using microwave and conventional heat, the range of suitable materials to withstand high temperatures typically in excess of 240 whilst not being hazardous to microwaves is limited. For example, aluminium foil containers such as those commonly employed in drink cartons are not suitable for microwave usage and will also not withstand other high temperatures.

Furthermore, conventional plastic packaging which are now widely used as microwavable packs are not suitable for combination oven operation.

SUMMARY OF THE INVENTION

In a first broad independent aspect, the invention provides a pack suitable for housing liquid and/or solid-liquid contents whose wall comprises a layer of board, an inner layer sufficiently impermeable to create a seal between the board and the pack's contents, and an outer protective layer covering the board, wherein the pack's layers are microwavable and the outer layer is breathable.

By breathable we mean sufficiently porous that, if the pack is microwaved, the outer layer can permit moisture or any gas or still any potentially deforming substance trapped in the pack's wall escaping through the layer. This combination of features effectively allows the pack to withstand temperature rises and microwaving without the packs layers blistering, bubbling or otherwise unduly disfiguring.

This combination of features is particularly advantageous in the specific application of combination oven cooking with microwave and conventional heat in excess of 240 C. It is also particularly advantageous because the pack in these conditions will be able to retain its configuration, particularly in terms of colour, structure and surface smoothness.

The pack will also be particularly advantageous because it simultaneously retains its impermeable aspect so that it will tend to protect the customer from leaks through the pack's wall which could be an important commercial deterrent to would-be purchasers but may also be hazardous to use.

One of the objectives of the invention is to provide a pack which has an inner surface sufficiently permeable to prevent the pack's contents from leaking through the walls of the pack. This would be particularly detrimental in the eyes of the customer handling the pack and may even be hazardous to the customer bearing in mind the high temperature of cooking used in this technology.

A further objective of the invention is to provide a pack which is sufficiently rigid to contain the food elements or other contents without readily collapsing on itself, thus allowing the pack to be handled without undue difficulty by the customer.

A further objective of the invention is to provide a pack that does not unduly change its appearance despite being submitted to elevated temperatures. Another objective of the invention is to present a pack which incorporates specialist layers of ink and varnish which survive the arduous cooking process.

In a subsidiary aspect in accordance with the invention's first broad aspect, the outer layer is a varnish and a further layer is provided between the varnish layer and the board which is of ink and which is breathable. This configuration will be beneficial because it will have the effect of essentially preventing the disfiguration of the printed portions which are those portions which usually primarily catch the eye of customers.

In a further subsidiary aspect, the breathable region is substantially limited to the ink layer area. Whilst it is believed that a certain degree of disfiguration may be tolerable in certain areas of the pack, disfiguration of the printed region would be particularly detrimental and therefore only rendering the ink layer area breathable would achieve an improved level of pack appearance without increasing the cost of rendering the entire outer pack layer breathable.

In a further subsidiary aspect, the breathable region comprises perforations spaced within the range of 5 mm to 40 mm. Within this range the perforations almost entirely prevent undue disfiguration of the pack. Whilst above that range noticeable disfiguration occurs.

In a further subsidiary aspect, the pitch of perforations is substantially 20 mm. At these levels, no noticeable disfiguration occurs when the packs are used in combination ovens.

In a further subsidiary aspect, the perforations are strips. Conventional forms of scoring apply circular pores onto a layer. Applying strips is advantageous for certain types of designs.

In a further subsidiary aspect, the outer layer is formed by strands of appropriate material with gaps formed between the strands acting as breathable regions. Traditionally, the outer layer is applied to cover the entire outer pack surface and perforations may then be applied by penetrating the outer surface. In this instance, the outer layer is formed by strands with gaps formed between the strands acting as breathable regions so that a single step of applying the outer layer is required rather than the traditional two step process of covering the outer surface of the pack and then penetrating the outer surface.

In a second broad independent aspect, the invention provides a sheet comprising a layer of board covered by an impermeable layer on one side and a protective layer on the other side covering the board, wherein the layers are microwavable and said protective layer incorporates a breathable region or regions. This configuration is particularly advantageous because it provides a sheet which may be folded into a pack having the advantages as outlined with reference to the first broad inventive aspect. It may also be used in other forms in combination cooking where its advantages of not unduly disfiguring at high temperatures and in microwave situations would come to light.

DETAILED DESCRIPTION OF THE INVENTION

Throughout this specification, the term "perforation" is to be interpreted broadly and will include within its scope cuts and scores.

Figure 1:
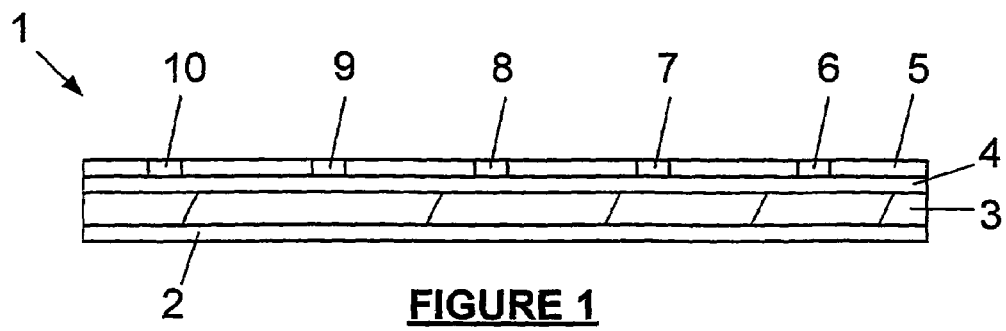
FIG. 1 shows a cross-sectional view of a portion of the wall of a pack or sheet in accordance with a first embodiment.

FIG. 1 shows a portion generally referenced 1 of a pack's wall or sheet comprising an inner impermeable layer 2. The inner impermeable layer 2 may be of PET (polyethylene perephthalate) or any other material suitable for creating an impermeable layer whilst being microwavable and eatable to a temperature of say 270 C. The structural strength of the pack will mainly be provided by the board layer 3 which may be of cardboard or any other appropriate board microwavable and eatable to temperatures in excess of 260 C as selected by the person skilled in the art.

On the outside of the board a layer of ink referenced 4 may be applied to mark the board with its trade mark or any other advertisement material. The invention also envisages the use of inks incorporating compounds to cause them to withstand temperature in excess of 260 C. In order to prevent the disfiguration of the board a protective varnish layer 5 is applied. The varnish will be selected by the person skilled in the art to be suitable for heating at temperatures in excess of 260 C and microwavable. The protective layer 5 comprises a number of perforations such as those referenced 6, 7, 8, 9 and 10.

These perforations may be formed by a screening process or any other appropriate manufacturing technique as selected by the person skilled in the art. The perforations illustrated perforate only the varnish layer.

Figure 2:
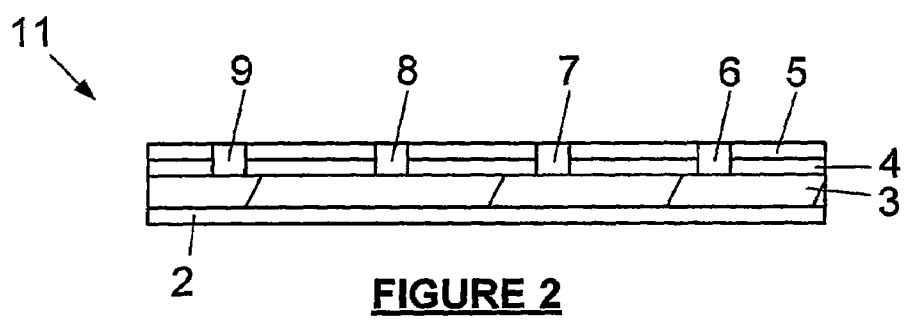
FIG. 2 shows a cross-sectional view of a portion of a pack's wall or sheet according to a second embodiment of the invention.

FIG. 2 shows a further portion generally referenced 11 of a pack's wall or sheet.

Similar components to portion 1 have been referenced by identical numerical references.

The perforations 6, 7, 8 and 9 traverse both the ink layer 4 and the varnish layer 5. In this instance, layer 4 and layer 5 form the breathable region of the pack which will limit any blistering, bubbling or undue disfiguration of the pack. These perforations may be set at 20 mm from one another in order to ideally achieve this effect.

Figure 3:
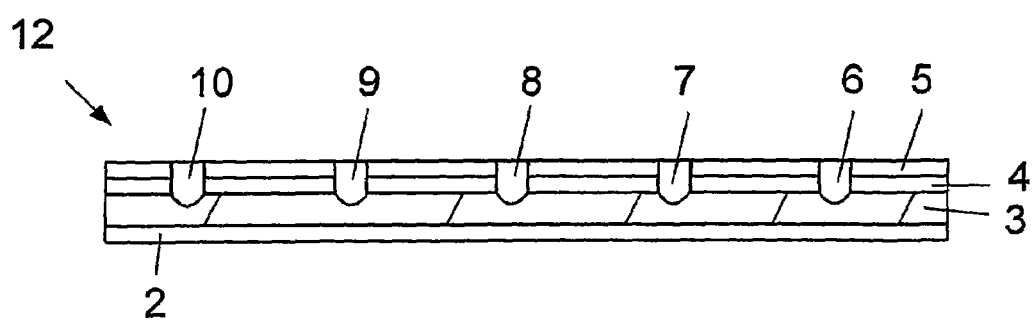
FIG. 3 shows a cross-sectional view of a pack's wall or sheet in accordance with a third embodiment of the invention.

FIG. 3 shows a further portion generally referenced 12 where identical components have retained identical numerical references. In this embodiment the perforations 6, 7, 8, 9 and 10 traverse layers 5 and 4 and partly extend into the board layer 3.

Figure 4:
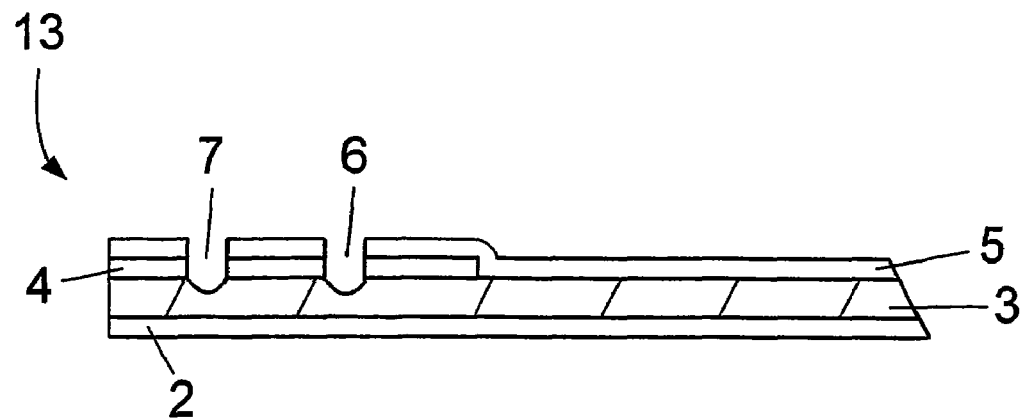
FIG. 4 shows a further cross-sectional view of a pack's wall or sheet in a fourth embodiment of the invention.

FIG. 4 shows a further pack wall or sheet portion generally referenced 13 where identical components have retained identical numerical references. In this instance the ink layer covers only a portion of the board and it is at this portion that perforations 6 and 7 are present and extend through a varnish layer 5, an ink layer 4 and partly through board layer 3.

Figure 5:
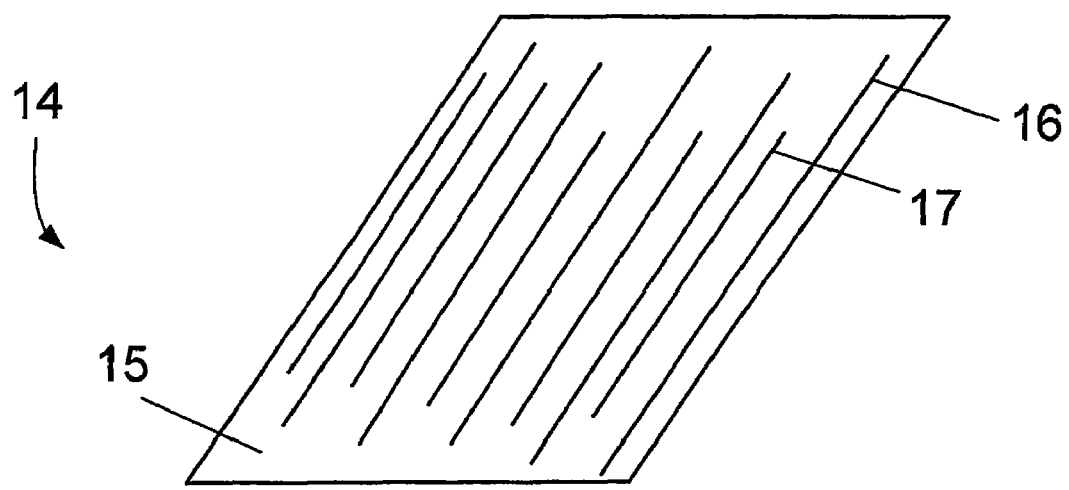
FIG. 5 shows a schematic perspective view of a board surface in accordance with a fifth embodiment of the invention.

FIG. 5 shows a portion 14 of a pack's wall or sheet with a top layer 15 of varnish applied on the top surface. Strips such as those referenced 16 and 17 are applied to the pack to achieve a breathable region in order to avoid undue disfiguration of the pack particularly in combined oven applications. The strips of the kind of strip 16 alternate with strips of the kind of strip 17 so as to achieve a compromise between structural strength of the pack and breathability.

Figure 6:
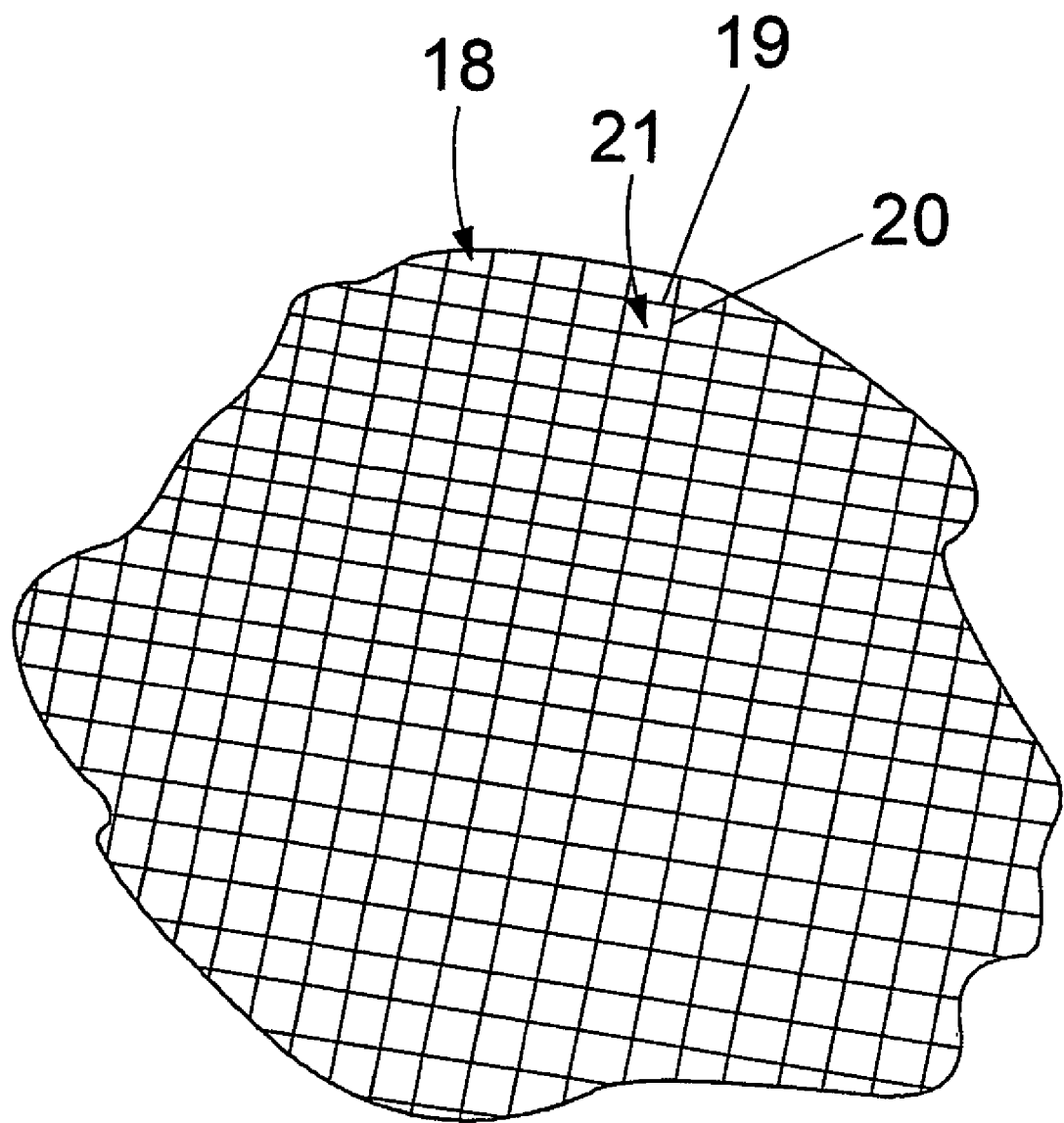
FIG. 6 shows a close-up plan view of a region of a pack's wall or sheet in accordance with a sixth embodiment of the invention.

FIG. 6 shows a close-up view of the region of a pack's wall or a sheet. The outer protective layer is formed of strands of appropriate material such as those referenced 19 and 20 which leave gaps such as that referenced 21 to achieve breathability.

The strands' material may be selected from known alternatives by the person skilled in the art.

The orientation of the strands may be selected by the person skilled in the art to contribute to the structural strength of the pack if appropriate.

The invention also envisages a pack with a board, sections of which are selected to be blank of any ink or varnish. The blank sections would allow any water trapped in the board during manufacturing of the pack to freely escape during the cooking process of the pack. In this configuration, the blank sections would fulfil the necessary breathable function of the pack.

The invention claimed is:

1. A microwaveable and ovenable pack suitable for housing at least one of liquid content and solid-liquid contents, said pack comprising:
    a wall with a layer of board, an impermeable inner layer creating a seal between said layer of board and said pack's contents and a breathable outer protective layer covering said board, wherein
    said breathable outer protective layer is a varnish;
    said layer of board contains a trapped substance selected from the group comprising moisture, water, gas and deforming substance;
    said wall contains perforations extending from said layer of board and through said outer layer of varnish; whereby when said pack is heated said impermeable inner layer remains impermeable and said perforations allow said trapped substance to escape said layer of board.

2. A pack according to claim 1, wherein the perforations are strips.

3. A pack according to claim 1, wherein the impermeable layer is of polyethylene perephthalate.

4. A pack according to claim 1, wherein the board is of cardboard.

5. A pack according to claim 1, wherein the perforations extend through the entire outer layer and partially through the board.

6. A pack according to claim 1, wherein the board comprises outer sections which incorporate varnish and outer sections which are blank of any varnish.

7. A pack according to claim 1, wherein the outer layer is a varnish and a further layer is provided between the varnish layer and the board which is of ink and which is breathable and wherein the breathable region is substantially limited to the ink layer area.

8. A microwaveable and ovenable sheet comprising a layer of board, an impermeable layer covering one side and a breathable protective layer on the other side covering the board, wherein
    said protective layer is a varnish;
    said layer of board contains a trapped substance selected from the group comprising moisture, water, gas and deforming substance;
    said wall contains perforations extending from said layer of board and through said layer of varnish; whereby when said sheet is heated said impermeable inner layer remains impermeable and said perforations allow said trapped substance to escape said layer of board.

9. A sheet according to claim 8, wherein the perforations are strips.

10. A sheet according to claim 8, wherein the impermeable layer is of polyethylene perephthalate.

11. A sheet according to claim 8, wherein the board is of cardboard.

12. A sheet according to claim 8, wherein the perforations extend through the entire outer layer and partially through the board.

13. A sheet according to claim 8, wherein the board comprises outer sections which incorporate varnish and outer sections which are blank of any varnish.

14. A sheet according to claim 8, wherein the outer layer is a varnish and a further layer is provided between the varnish layer and the board which is of ink and which is breathable and wherein the breathable region is substantially limited to the ink layer area.

* * * * *